L. J. MONAHAN & C. J. POPE.
SOY MILK PRODUCT AND PROCESS OF MAKING THE SAME.
APPLICATION FILED JULY 28, 1913.
1,104,376.
Patented July 21, 1914.
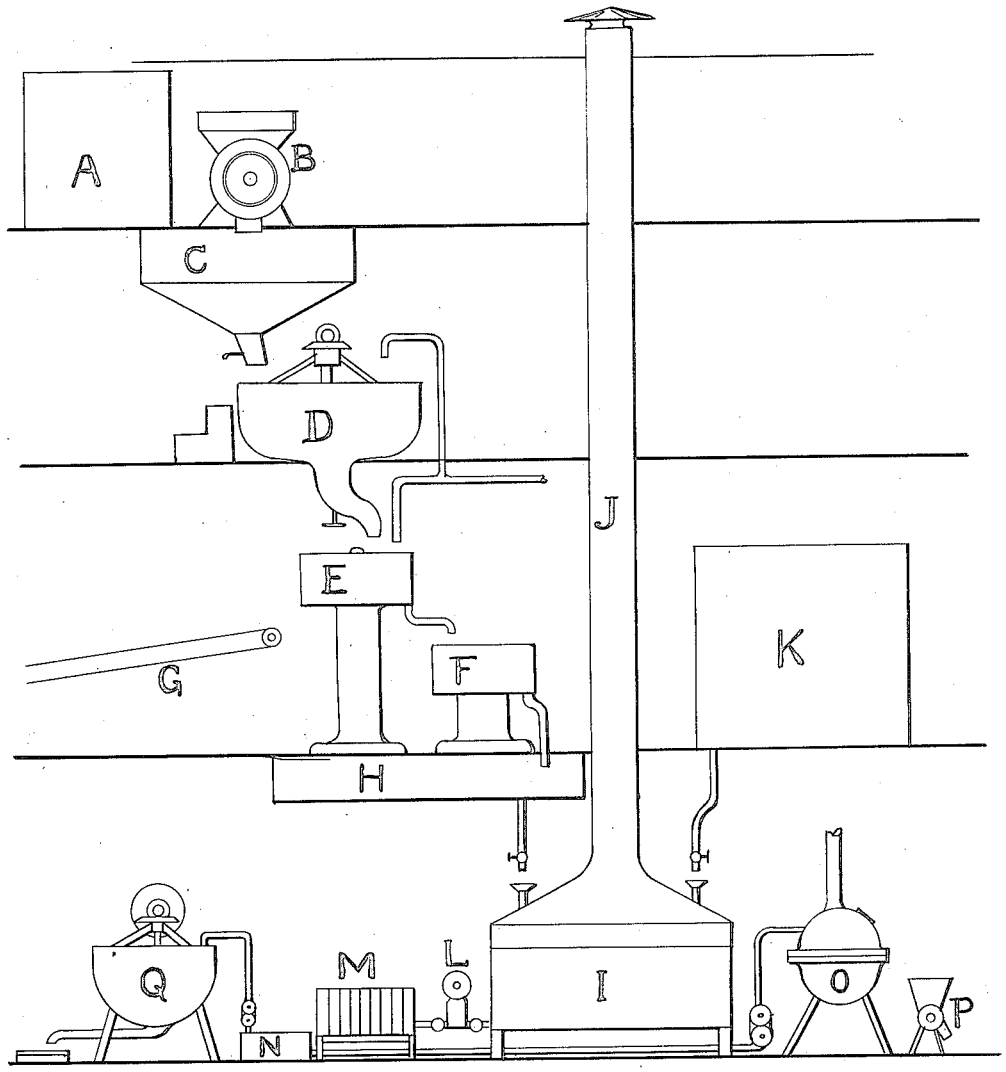
WITNESSES:
INVENTORS

UNITED STATES PATENT OFFICE.

LOUIS J. MONAHAN AND CHARLES J. POPE, OF OSHKOSH, WISCONSIN.

SOY-MILK PRODUCT AND PROCESS OF MAKING THE SAME.

1,104,376.  Specification of Letters Patent.  Patented July 21, 1914.

Application filed July 28, 1913. Serial No. 781,585.

*To all whom it may concern:*

Be it known that we, LOUIS J. MONAHAN and CHARLES J. POPE, citizens of the United States, residing at Oshkosh, in the county of Winnebago and State of Wisconsin, have invented certain new and useful Improvements in Soy-Milk Products and Processes of Making the Same, of which the following is a specification.

The invention relates to a new and useful invention consisting of a new process of producing malted soy milk chocolates or malted milk powder.

The object of the invention is to provide a systematic process for producing soy milk from soy beans, adding malt extract and drying or further adding chocolate and cooking down to dryness to produce a product either with or without chocolate.

The drawings herewith show the operation of a plant arranged to carry out this process in which A is a bin for supply of soy beans, B a grinding mill for pulverizing the beans, C a hopper for holding the pulverized beans, D a specially designed emulsifying mill into which the pulverized beans are fed together with water, and wherein a perfect emulsion of the bean fats and water is obtained. The residue and soy milk which is produced in the emulsifying mill is dumped into the centrifugal separator E which drives off the milk, the residue being washed during the operation of the centrifugal to extract all of the milk. From the centrifugal the filtered liquid flows to centrifugal F where it is filtered again through a fine filter cloth lining to leave the milk free from sediment. The residue from the centrifugals is carried away by a conveyer G on which it is thrown.

The filtered milk flows to a tank H and from there taken to the cooker and concentrator, I, which has a hood J to carry off the steam, and a steam jacket or coil to supply heat for cooking. Malt extract is prepared in the usual manner and a supply carried in a tank K from which a suitable proportion is added to the milk in the cooker I. After the milk has been sufficiently cooked it is pumped by means of a pump L through a filter press M to separate the insoluble matter or any of the constitutents that may have been coagulated or rendered insoluble in cooking. From the filter press it flows to a storage tank N ready for use with the other ingredients.

For making dry malted milk, a large proportion of malt extract is used and the liquid pumped from tank N to a vacuum pan O where the material is dried at a temperature low enough to allow the dried product to dissolve in the water. The dried product is then ground to a powder in a mill P when it is ready for the market.

For producing milk chocolate cakes the malt milk liquid is pumped from tank N into a cooking kettle P where it can be agitated during cooking, here chocolate and sugar are mixed with the malt milk liquid and the whole cooked down to a thick consistency after which it is run out from the kettle into suitable molds to harden and be packed for market.

The above is an outline of the process in the plant but to bring the product to perfect condition it is necessary to follow out a process as outlined in our other patent filed April 10—1913 Serial #760241 wherein a small amount of sodium bicarbonate is added to the bean powder to prevent acidifying and a quantity of cocoanut oil to modify the taste. Other ingredients may be used to suit the taste as may be desired.

The essential features of the process consist in pulverizing the beans, then emulsifying them with approximately an equal amount of water, then adding more water during agitating and rubbing until practically all of the fats and oils are emulsified, which action is caused by the large content of casein contained in the bean, in fact this casein is sufficient to cause the complete emulsion of additional material such as the cocoanut oil above referred to. After the emulsion is complete the soy milk is separated from the residue and cooked to drive off the raw taste and odor as well as insoluble matter, it is concentrated to leave a syrupy liquid before using further in the process. To make the malted milk powder it is necessary to add a good proportion of malt extract or "wort" and dry in a vacuum at a temperature of about 120° F. then grind fine.

For the milk chocolate cakes a less proportion of malt is added and a large amount of chocolate or cocoa and sugar to sweeten; the proportions running about as follows:— 2 lb. concentrated milk of about 50% solid consistency. 5 lbs. of sugar, 1½ lbs. malt extract, 12% solids, 1 lb. chocolate powder, this mixture can of course be varied to suit the taste. After the mixture is further cooked or concentrated down to a point when it will just flow, it is then run into molds and allowed to harden, after which it can be wrapped and packed.

The features of this process are the utilizing of soy milk as a substitute for cow's milk for the double purpose of lowering the cost of production and enabling a strictly sanitary product to be made. The soy milk having all the food properties of cow's milk with the added high quality of food value of the malt extract being the essential features of this invention.

Many other combinations and additions to effect taste results will suggest themselves but we have outlined combinations that provide the food value as well as a pleasing taste.

We claim:—

1. The process of making malted soy milk which consists in emulsifying soy beans, filtering out the liquid, adding malt extract to the filtrate and evaporating off the water.

2. The process of making malted soy milk which consists in emulsifying soy beans separating the liquid from the residue, cooking the filtrate, refiltering the liquid, adding malt extract and evaporating to dryness.

3. The process of making malted soy milk which consists in extracting the soluble food products from soy beans in the form of an emulsion, cooking and filtering the extract, adding malt extract and recooking the mixture.

4. The process of making malted soy milk which consists in extracting the soluble food products from soy beans, adding a portion of cocoanut oil, cooking the extract, filtering off the insoluble content, adding malt extract and evaporating to dryness *in vacuo*.

5. The process of making malted soy milk which consists in emulsifying soy beans previously mixed with a portion of sodium bicarbonate, separating the liquid emulsion from the bean residue, cooking the liquid, filtering off the insoluble matter, adding malt extract and evaporating to dryness *in vacuo*.

6. The process of making malted soy milk which consists in extracting the soluble food products from soy beans, in the form of an emulsion, adding malt extract and evaporating to dryness *in vacuo*.

7. A new article of manufacture comprising a dried product obtained from the soluble food products of soy beans and malt extract.

8. A new article of manufacture consisting of a mixture of soluble and emulsifiable extract from soy beans, malt extract and chocolate cooked to dryness.

9. A new article of manufacture consisting of cakes or bricks produced by the cooking to dryness of a mixture of the soluble food extract from soy beans, malt extract and chocolate.

10. The process of making a new food product which consists in extracting the emulsifiable food products from soy beans in the form of an emulsion, cooking and concentrating the emulsion, filtering the cooked product, adding malt extract and chocolate, cooking and concentrating the mixture down to a thick consistency and pouring in suitable molds to harden.

In testimony whereof we affix our signatures, in the presence of two witnesses.

LOUIS J. MONAHAN.
CHARLES J. POPE.

Witnesses:
A. F. DUKERSCHEIN,
MARY MONAHAN.